(12) United States Patent
Otsuka et al.

(10) Patent No.: US 12,194,806 B2
(45) Date of Patent: Jan. 14, 2025

(54) SUSPENSION ARM

(71) Applicant: NIPPON STEEL CORPORATION, Tokyo (JP)

(72) Inventors: Kenichiro Otsuka, Tokyo (JP); Masafumi Azuma, Tokyo (JP); Koichi Hamada, Tokyo (JP); Ryo Tabata, Tokyo (JP); Ryo Urushibata, Tokyo (JP); Yuki Kitahara, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 0 days.

(21) Appl. No.: 18/276,621

(22) PCT Filed: Mar. 28, 2022

(86) PCT No.: PCT/JP2022/015122
§ 371 (c)(1),
(2) Date: Aug. 9, 2023

(87) PCT Pub. No.: WO2022/210580
PCT Pub. Date: Oct. 6, 2022

(65) Prior Publication Data
US 2024/0123782 A1    Apr. 18, 2024

(30) Foreign Application Priority Data
Mar. 31, 2021   (JP) .................... 2021-059014

(51) Int. Cl.
*B60G 7/00*   (2006.01)
(52) U.S. Cl.
CPC .......... *B60G 7/001* (2013.01); *B60G 2206/10* (2013.01)
(58) Field of Classification Search
CPC ................ B60G 7/001; B60G 2206/11; B60G 2206/8201; B60G 3/06; B60F 2206/10
(Continued)

(56) References Cited

U.S. PATENT DOCUMENTS

| | | | |
|---|---|---|---|
| 8,690,176 B2 * | 4/2014 | Perry .................... | B21D 53/88 |
| | | | 280/124.134 |
| 10,202,013 B2 * | 2/2019 | Steiner ................. | B60G 7/001 |
| | | (Continued) | |

FOREIGN PATENT DOCUMENTS

| | | | | |
|---|---|---|---|---|
| EP | 3539802 A1 * | 9/2019 | ............. | B60G 7/001 |
| JP | 2002-200908 A | 7/2002 | | |
| | (Continued) | | | |

OTHER PUBLICATIONS

English Translation of WO-2014129046-A1, retrieved Mar. 23, 2024 (Year: 2014).*
English Translation for EP3539802 (Year: 2019).*

*Primary Examiner* — Paul N Dickson
*Assistant Examiner* — Caitlin Anne Miller
(74) *Attorney, Agent, or Firm* — Birch, Stewart, Kolasch & Birch, LLP

(57) ABSTRACT

A suspension arm includes a main body. The main body includes a curved portion curved along a longitudinal direction and has a closed section. The main body includes an inner side wall, an outer side wall, a first side wall, and a second side wall. The inner side wall corresponds to an inner side of a curve of the curved portion. The outer side wall corresponds to an outer side of the curve of the curved portion. A thickness of the inner side wall is larger than a thickness of the outer side wall. In sectional view of the main body perpendicular to the longitudinal direction, each of a length of the first side wall and a length of the second side wall is longer than each of a length of the inner side wall and a length of the outer side wall.

9 Claims, 10 Drawing Sheets

(58) Field of Classification Search
USPC .................................................. 280/124.134
See application file for complete search history.

(56) References Cited

U.S. PATENT DOCUMENTS

| | | | |
|---|---|---|---|
| 2008/0150249 A1* | 6/2008 | Murata | .................... B60G 3/14 |
| | | | 280/124.128 |
| 2021/0008949 A1* | 1/2021 | Takahashi | .............. B60G 7/001 |

FOREIGN PATENT DOCUMENTS

| | | | |
|---|---|---|---|
| JP | 2004-262453 A | 9/2004 | |
| JP | 2018-161989 A | 10/2018 | |
| JP | 2018-161990 A | 10/2018 | |
| JP | 2020183181 A * | 11/2020 | |
| WO | WO-2014129046 A1 * | 8/2014 | ............... B60G 3/20 |

* cited by examiner

SUSPENSION ARM

TECHNICAL FIELD

The present disclosure relates to a suspension arm, particularly to a suspension arm that is one of components constituting a suspension of a vehicle such as an automobile.

BACKGROUND ART

A vehicle includes suspensions. The suspensions each include a suspension arm as a component that connects a vehicle body and a wheel. For example, an upper arm and a lower arm fall under suspension arms.

In general, a suspension arm includes a main body including a curved portion that is curved along a longitudinal direction. The main body is provided with attachment portions at both ends. One of the attachment portions is used to connect a wheel and the suspension arm. The other attachment portion is used to connect a vehicle body and the suspension arm. Accordingly, in a vehicle, a suspension arm is supported at both end portions (attachment portions).

While a vehicle is traveling, its suspension arms receive loads. To achieve good riding comfort, the suspension arms are required to have a high rigidity. In particular, when a vehicle turns or is in braking, its suspension arms often receive high compressive loads in their longitudinal directions. Accordingly, suspension arms are required to have high rigidities particularly against compressive loads in their longitudinal directions.

A conventional suspension arm is constituted by two formed members that are formed by performing press forming on a steel sheet. The two formed members have shapes symmetrical to each other and have transverse sections each having a wide U shape. By joining edge portions of the two formed members together by arc welding, a suspension arm having a closed section is formed (e.g., see Japanese Patent Application Publication No. 2004-262453 (Patent Literature 1)). Having the closed section, the suspension arm has a high rigidity.

CITATION LIST

Patent Literature

Patent Literature 1: Japanese Patent Application Publication No. 2004-262453

SUMMARY OF INVENTION

Technical Problem

To increase fuel efficiency of vehicles, there is a demand for reducing weights of suspension arms. As described above, a conventional suspension arm is constituted by two formed members symmetrical to each other. Accordingly, the conventional suspension arm has a constant sheet thickness. When sheet thicknesses of the two formed members are decreased, the sheet thickness of the suspension arm is decreased as a whole, and a weight of the suspension arm can be reduced. However, in this case, a rigidity of the suspension arm decreases, which makes it difficult to ensure good riding comfort.

An objective of the present disclosure is to provide a suspension arm that enables achievement of weight reduction while keeping a rigidity of the suspension arm.

Solution to Problem

A suspension arm according to the present disclosure includes a main body that includes a curved portion curved along a longitudinal direction and has a closed section, a first attachment portion that includes a first hole, and a second attachment portion that includes a second hole. The first attachment portion is provided at one end of the main body in the longitudinal direction. The second attachment portion is provided at the other end of the main body in the longitudinal direction. The main body includes an inner side wall, an outer side wall, a first side wall, and a second side wall. The inner side wall corresponds to an inner side of the curve of the curved portion. The outer side wall corresponds to an outer side of the curve of the curved portion. The first side wall connects one side edge of the inner side wall and one side edge of the outer side wall. The second side wall connects the other side edge of the inner side wall and the other side edge of the outer side wall and faces the first side wall. A thickness of the inner side wall is larger than a thickness of the outer side wall. In sectional view of the main body perpendicular to the longitudinal direction, each of a length of the first side wall and a length of the second side wall is longer than each of a length of the inner side wall and a length of the outer side wall.

Advantageous Effects of Invention

The suspension arm according to the present disclosure enables achievement of weight reduction while keeping a rigidity of the suspension arm.

DESCRIPTION OF EMBODIMENTS

Embodiments of the present disclosure will be described below. Although the following description will be made about embodiments of the present disclosure that are taken as examples, the present disclosure is not limited to examples described below. In the following description, specific numerical values and specific materials may be shown as examples, but the present disclosure is not limited to these examples.

To solve the problems described above, the present inventors conducted diligent studies and consequently obtained the following findings. In the studies, as an example of a suspension arm, an upper arm that is one of components constituting an independent suspension was adopted.

Figure 1:
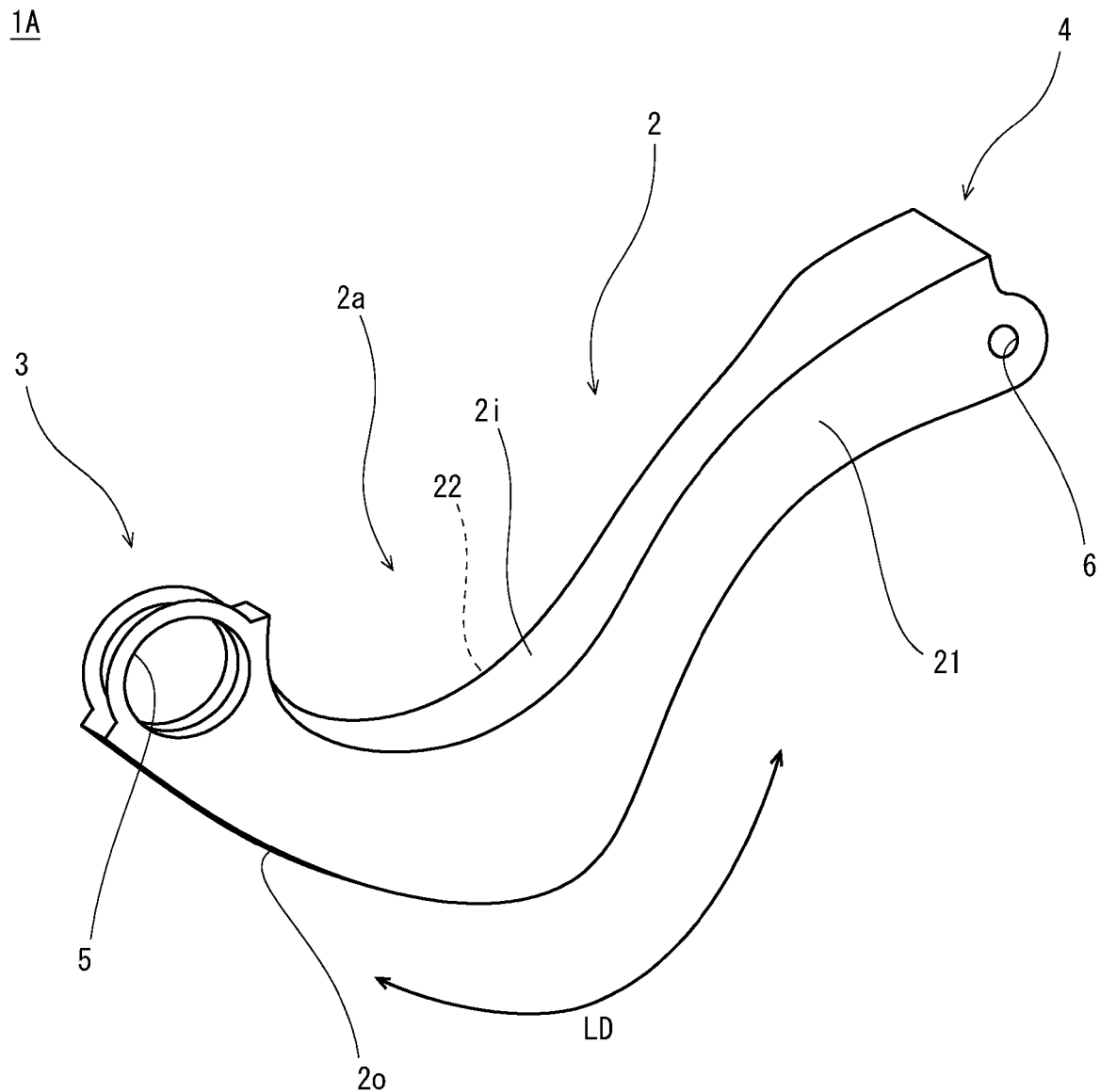
FIG. 1 is a perspective view of a suspension arm.

FIG. 1 is a perspective view of a suspension arm 1A. The suspension arm 1A includes a main body 2, a first attachment portion 3 and a second attachment portion 4. The main body 2 is a long-length portion of the suspension arm 1A and is disposed between the first attachment portion 3 and the second attachment portion 4. The main body 2 includes a curved portion 2a that is curved along a longitudinal direction LD. In the suspension arm 1A, the longitudinal direction LD is a direction in which the main body 2 including the curved portion 2a being curved extends. The longitudinal direction LD is not a direction parallel to a straight line that connects the first attachment portion 3 and the second attachment portion 4. The main body 2 has a closed section.

The first attachment portion 3 is provided at one end of the main body 2 in the longitudinal direction LD. The second attachment portion 4 is provided at the other end of the main body 2 in the longitudinal direction LD. The first attachment portion 3 has a first hole 5. The first hole 5 is used to connect the suspension arm 1A and a wheel (not illustrated). The second attachment portion 4 has a second hole 6. The second hole 6 is used to connect the suspension arm 1A and a vehicle body (not illustrated).

In a vehicle, the suspension arm 1A is supported by a shaft member (not illustrated) that is inserted through the first hole 5 and another shaft member (not illustrated) that is inserted through the second hole 6. In short, the suspension arm 1A is supported at both end portions (the first attachment portion 3 and the second attachment portion 4).

The main body 2 includes an inner side wall 2i, an outer side wall 2o, a first side wall 21, and a second side wall 22. The inner side wall 2i corresponds to an inner side of the curve of the curved portion 2a. The outer side wall 2o corresponds to an outer side of the curve of the curved portion 2a. The first side wall 21 connects one side edge of the inner side wall 2i and one side edge of the outer side wall 2o. The second side wall 22 connects the other side edge of the inner side wall 2i and the other side edge of the outer side wall 2o. The second side wall 22 faces the first side wall 21. The inner side wall 2i, the outer side wall 2o, the first side wall 21, and the second side wall 22 form the closed section. A sectional shape of the main body 2 perpendicular to the longitudinal direction LD is roughly rectangular. In sectional view perpendicular to the longitudinal direction LD, each of a length of the first side wall 21 and a length of the second side wall 22 is longer than each of a length of the inner side wall 2i and a length of the outer side wall 2o.

In a case where the suspension arm 1A is an upper arm, the inner side wall 2i is located on an upper side, and the outer side wall 2o is located on a lower side in a state where the suspension arm 1A is attached to a vehicle. For example, the first side wall 21 faces the front of the vehicle, and the second side wall 22 faces the rear of the vehicle. When the vehicle turns, the suspension arm 1A receives a high compressive load in the longitudinal direction LD.

The suspension arm 1A illustrated in FIG. 1 was subjected to a CAE analysis. In the analysis, an analytic model of the suspension arm 1A illustrated in FIG. 1 was created and used in a simulation of deformation of the suspension arm 1A that receives a compressive load in the longitudinal direction LD in accordance with an actual situation. Specifically, a periphery of the first hole 5 of the first attachment portion 3 was rotatably constrained so as to allow the first attachment portion 3 to rotate about the first hole 5. A load was applied to a periphery of the second hole 6 of the second attachment portion 4 from the second hole 6 toward the first hole 5. For the suspension arm 1A, the load serves as the compressive load. Then, a displacement of the second hole 6 in a loading direction was investigated. The displacement of the second hole 6 represents a degree of the deformation of the suspension arm 1A. The smaller the displacement of the second hole 6 is, the more the suspension arm 1A resists deforming, and the higher a rigidity of the suspension arm 1A is.

Figure 2:
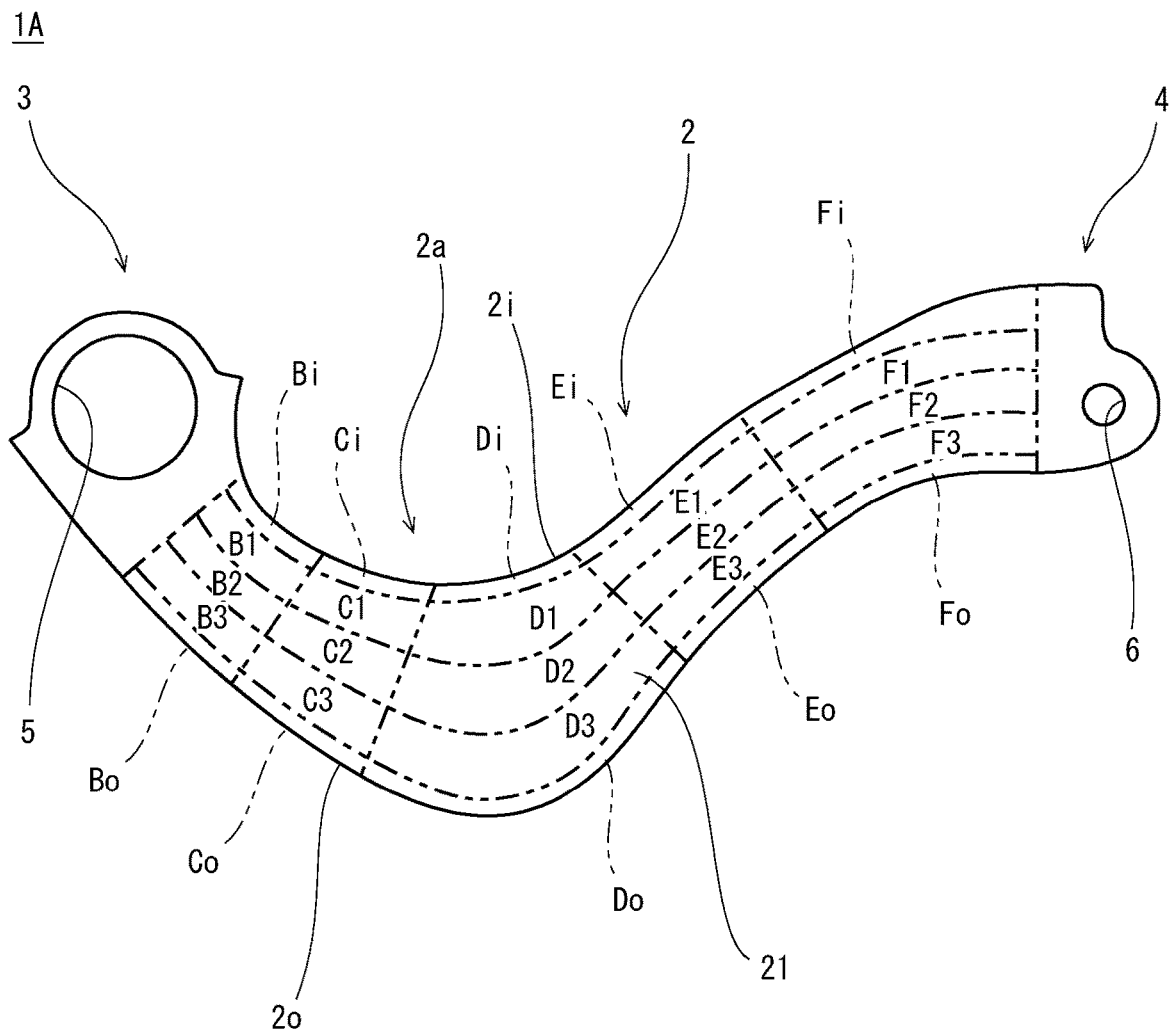
FIG. 2 is a side view of an analytic model for describing analysis conditions.

The CAE analysis was conducted under a plurality of conditions. FIG. 2 is a side view of the analytic model for describing analysis conditions. FIG. 2 illustrates a plane when the suspension arm 1A illustrated in FIG. 1 is viewed from the side. From another point of view, FIG. 2 illustrates a plane when the suspension arm 1A illustrated in FIG. 1 attached to a vehicle is viewed from the front or the rear. FIG. 2 illustrates the first side wall 21 and does not illustrate the second side wall. In FIG. 2, the second side wall is disposed behind the first side wall 21 and has the same shape as the first side wall 21.

As illustrated with two-dot-dash lines in FIG. 2, the main body 2 of the suspension arm 1A was divided into a large number of regions. Specifically, the inner side wall 2i was divided into five regions Bi, Ci, Di, Ei, and Fi along the longitudinal direction LD (FIG. 1) of the suspension arm 1A. Likewise, the outer side wall 2o was divided into five regions Bo, Co, Do, Eo, and Fo along the longitudinal direction LD of the suspension arm 1A. Likewise, the first side wall 21 and the second side wall (not illustrated) were each divided into five regions along the longitudinal direction LD of the suspension arm 1A. Further, the regions of each of the first side wall 21 and the second side wall were each divided into three regions along a direction perpendicular to the longitudinal direction LD of the suspension arm 1A. In the inner side wall 2i, the regions Bi, Ci, and Di are included in the curved portion 2a. In the outer side wall 2o, the regions Bo, Co, and Do are included in the curved portion 2a.

In all the regions, a sheet thickness of the suspension arm 1A illustrated in FIG. 2 was set to be constant. This condition was taken as a base condition to conduct the analysis. Further, for each region illustrated in FIG. 2, the sheet thickness was changed to twice the sheet thickness of the base condition, and under a condition of the changed sheet thickness, the analysis was conducted. The sheet thickness of the suspension arm 1A was set to 2.6 mm under the base condition. A material of the suspension arm 1A was set to high-tensile steel of 780 MPa grade. The load applied to the second attachment portion 4 was set to 10 N.

In general, enhancement of rigidity is expected as a sheet thickness is increased. As described above, by conducting the analysis under such conditions that the sheet thickness is increased for each region and investigating the displacement of the second hole 6, a degree to which the sheet thickness of each region contributes to the rigidity of the suspension arm 1A can be examined.

Figure 3:
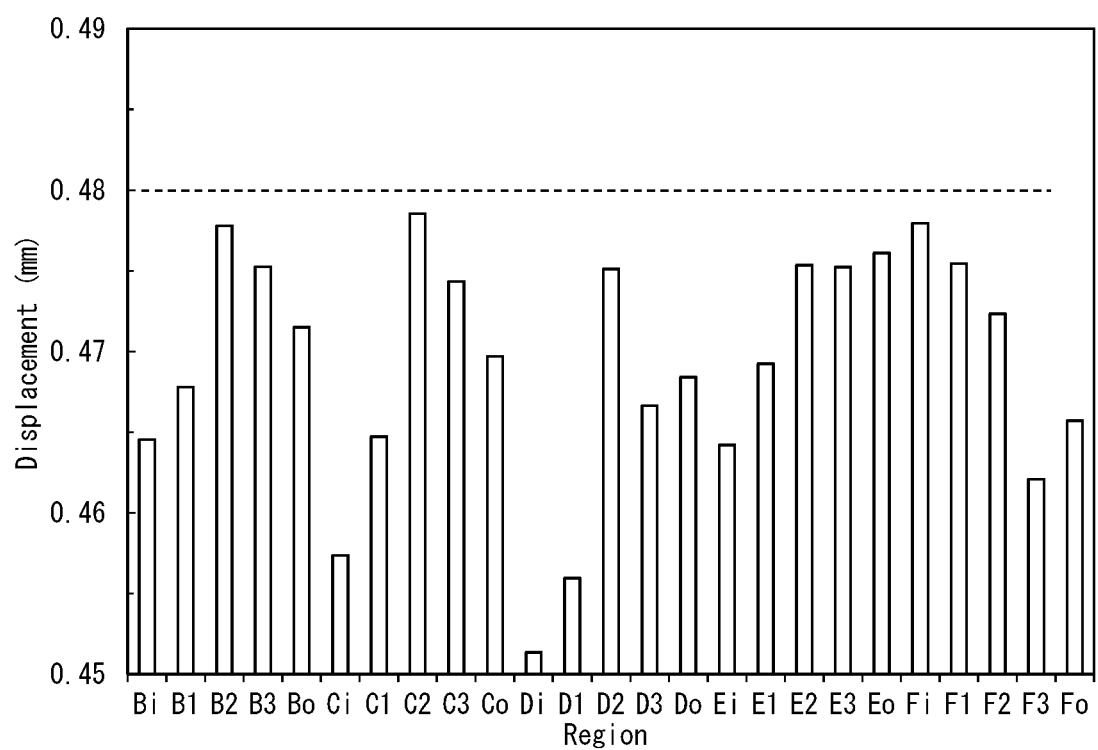
FIG. 3 is a graph that is a summary of results of an analysis.

FIG. 3 is a graph that is a summary of results of the analysis. FIG. 3 shows displacements of the second hole 6 under such conditions that the sheet thickness was changed for each region shown in FIG. 2.

Referring to FIG. 3, under the base condition, the displacement of the second hole 6 was 0.48 mm (see a dotted line in FIG. 3). Increasing the sheet thickness of every region resulted in a decrease in the displacement of the second hole 6 from the displacement under the base condition. In particular, the displacement was significantly decreased when the sheet thickness was increased in each of the regions Bi, Ci, and Di, which were included in the curved portion 2a, as well as the region Ei, which was adjacent to the region Di, in the inner side wall $2i$. The displacement was also significantly decreased when the sheet thickness was increased in each of the regions C1 and D1, which were close to these regions Bi, Ci, Di, and Ei, in the first side wall 21 and the second side wall 22. When the sheet thickness was increased in each of regions other than these regions Bi, Ci, Di, Ei, C1, and D1, the resultant decreases in displacement were not recognized as being significant.

These results show the following. A thickness (sheet thickness) of the inner side wall $2i$ contributes to the rigidity of the suspension arm 1A. Further, thicknesses (sheet thicknesses) of the first side wall 21 and the second side wall 22 in the vicinity of the inner side wall $2i$ also contribute to the rigidity of the suspension arm 1A. A thickness (sheet thickness) of the outer side wall $2o$ does not contribute much to the rigidity of the suspension arm 1A. Thicknesses (sheet thicknesses) of the first side wall 21 and the second side wall 22 in the vicinity of the outer side wall $2o$ do not contribute much to the rigidity of the suspension arm 1A, either. In summary, the rigidity of the suspension arm 1A is more enhanced by increasing the thickness of the inner side wall $2i$ rather than increasing the thickness of the outer side wall $2o$.

Such a situation is brought by a mechanism described below.

When the suspension arm 1A having the curved portion $2a$ receives a compressive load in the longitudinal direction LD in accordance with an actual situation, a compressive force is applied to regions of the inner side wall $2i$ included in the curved portion $2a$, producing a compressive strain in the regions. In contrast, a tensile force is applied to regions of the outer side wall $2o$ included in the curved portion $2a$, producing a tensile strain in the regions. The regions in which the tensile strain is produced do not undergo out-of-plane deformation. In contrast, the regions in which the compressive strain is produced undergo out-of-plane deformation. In short, the regions of the inner side wall $2i$ included in the curved portion $2a$ undergo bending deformation.

Here, we consider a rigidity of a member given a different sheet thickness of the member under such a condition that its sectional area is kept constant from a strength-of-materials point of view. When a tensile force is applied to the member, the rigidity has a correlation with a product of a first power of the sheet thickness and a Young's modulus. In contrast, when a compressive force is applied to the member, the rigidity has a correlation with a product of an nth power (n: a value more than 1 (e.g., an integer of 2 or more)) of the sheet thickness and the Young's modulus. This is due to the following reasons. When a compressive force is applied to the member, part of the member undergoes out-of-plane deformation. In short, the part of the member undergoes bending deformation. The member undergoing bending deformation has a flexural rigidity that depends on a second moment of area. The second moment of area has a correlation with an nth power of the sheet thickness.

Therefore, in the suspension arm 1A, by increasing the thickness (sheet thickness) of the inner side wall $2i$, which can undergo bending deformation to produce a compressive strain, the rigidity is enhanced in correlation with an nth power of the sheet thickness. In contrast, in the suspension arm 1A, by increasing the thickness (sheet thickness) of the outer side wall $2o$, in which a tensile strain can be produced, the rigidity is enhanced in correlation with a first power of the sheet thickness. Accordingly, to enhance the rigidity of the suspension arm 1A more, the thickness of the inner side wall $2i$ should be increased rather than increasing the thickness of the outer side wall $2o$. In particular, even a slight increase in the thickness of the inner side wall $2i$ enhances the rigidity of the suspension arm 1A. This is because the rigidity is enhanced in correlation with an nth power of the sheet thickness.

From another point of view, in the suspension arm 1A, by reducing the thickness (sheet thickness) of the outer side wall $2o$, in which a tensile strain can be produced, the rigidity is decreased in correlation with a first power of the sheet thickness. Accordingly, by increasing the thickness (sheet thickness) of the inner side wall $2i$, the rigidity of the suspension arm 1A can be kept even when the thickness of the outer side wall $2o$ is reduced by an amount larger than an amount by which the thickness of the inner side wall $2i$ is increased.

From the above, in the suspension arm 1A that has the curved portion $2a$ and is to receive a compressive load in the longitudinal direction LD, by increasing the thickness of the inner side wall $2i$ and reducing the thickness of the outer side wall $2o$ by an amount larger than an amount by which the thickness of the inner side wall $2i$ is increased, it is possible to combine keeping the rigidity of the suspension arm and reducing a weight of the suspension arm. In this case, the thickness of the inner side wall $2i$ is larger than the thickness of the outer side wall $2o$.

The suspension arm according to embodiments of the present disclosure is a suspension arm that is made based on the findings described above.

The suspension arm according to an embodiment of the present disclosure includes a main body that includes a curved portion curved along a longitudinal direction and has a closed section, a first attachment portion that includes a first hole, and a second attachment portion that includes a second hole. The first attachment portion is provided at one end of the main body in the longitudinal direction. The second attachment portion is provided at the other end of the main body in the longitudinal direction. The main body includes an inner side wall, an outer side wall, a first side wall, and a second side wall. The inner side wall corresponds to an inner side of the curve of the curved portion. The outer side wall corresponds to an outer side of the curve of the curved portion. The first side wall connects one side edge of the inner side wall and one side edge of the outer side wall. The second side wall connects the other side edge of the inner side wall and the other side edge of the outer side wall and faces the first side wall. A thickness of the inner side wall is larger than a thickness of the outer side wall. In sectional view of the main body perpendicular to the longitudinal direction, each of a length of the first side wall and a length of the second side wall is longer than each of a length of the inner side wall and a length of the outer side wall (first configuration).

In the suspension arm having the first configuration, the thickness of the inner side wall is larger than the thickness of the outer side wall. Such a situation arises by increasing the thickness of the inner side wall and reducing the thickness of the outer side wall by an amount larger than an amount by which the thickness of the inner side wall is increased. In this case, the weight reduction of the suspension arm can be achieved by reducing the thickness of the outer side wall, and the rigidity of the suspension arm can be kept by increasing the thickness of the inner side wall. In addition, collision properties of the suspension arm are also enhanced.

The suspension arm having the first configuration preferably has the following configuration. The thickness ta of the inner side wall, the thickness tb of the outer side wall, a surface area Sa of the inner side wall, and a surface area Sb of the outer side wall satisfy Formula (1) shown below. Further, in a section of the inner side wall in the curved portion perpendicular to the longitudinal direction, a second moment of area Iz in the case where ta denotes the thickness of the inner side wall, and tb denotes the thickness of the outer side wall satisfies Formula (2) shown below in comparison with a second moment of area Iy in a case where the thickness of the inner side wall and the thickness of the outer side wall are assumed to be "(Sa×ta+Sb×tb)/(Sa+Sb)" (second configuration).

$$ta > (Sa \times ta + Sb \times tb)/(Sa + Sb) > tb \tag{1}$$

$$Iz > Iy \times 0.85 \tag{2}$$

In Formula (1), "(Sa×ta+Sb×tb)/(Sa+Sb)" is a uniformized thickness. The uniformized thickness means a thickness of a suspension arm obtained by uniformizing thicknesses of all regions in the inner side wall and the outer side wall in such a manner that the suspension arm has the same sectional shape and the same weight as a sectional shape and a weight of the suspension arm having the second configuration. A suspension arm having the uniformized thickness is equivalent to a conventional suspension arm having a constant sheet thickness. Under the condition given by Formula (1), in the suspension arm having the second configuration, the thickness ta of the inner side wall is larger than the sheet thickness of the conventional suspension arm, and the thickness tb of the outer side wall is smaller than the sheet thickness of the conventional suspension arm. In this case, as described above, the weight reduction of the suspension arm can be achieved, and the rigidity of the suspension arm can be kept.

In Formula (2), Iy means a second moment of area of the conventional suspension arm having the uniformized thickness. In Formula (2), Iz means a second moment of area of the suspension arm having the second configuration, in which the thickness to of the inner side wall is larger than the thickness tb of the outer side wall. In general, the rigidity is determined depending on the second moment of area. However, as long as the condition given by Formula (2) is satisfied, the second moment of area Iz of the suspension arm having the second configuration may be smaller than the second moment of area Iy of the conventional suspension arm. This is because, in the suspension arm having the second configuration, bending deformation related to the second moment of area is prevented by virtue of an increase in the thickness of the inner side wall where a compressive strain can be produced. As a result, in the suspension arm having the second configuration, its rigidity can be enhanced even when its second moment of area Iz is small.

The suspension arm having the first configuration or the second configuration preferably has the following configuration. The first side wall is divided into an inner first side wall that is connected to the inner side wall and an outer first side wall that is connected to the outer side wall. The second side wall is divided into an inner second side wall that is connected to the inner side wall and an outer second side wall that is connected to the outer side wall. The main body includes a first member and a second member. The first member includes the inner side wall, the inner first side wall, and the inner second side wall. The second member includes the outer side wall, the outer first side wall, and the outer second side wall. A sheet thickness of the first member is larger than a sheet thickness of the second member. The first member and the second member are joined together by welding (third configuration).

The main body of a suspension arm having the third configuration is constituted by two members: the first member and the second member. In particular, the first member includes the inner side wall, and the second member includes the outer side wall that is different in shape from the inner side wall. Accordingly, the first member and the second member have shapes that are asymmetrical to each other. In addition, since the thickness of the inner side wall is larger than the thickness of the outer side wall, the sheet thickness of the first member is larger than the sheet thickness of the second member. For example, the first member can be formed by performing pressing on a steel sheet. The second member can be formed by performing pressing on a steel sheet that is thinner than the steel sheet for the first member. The inner first side wall of the first member is joined to the outer first side wall of the second member by welding, and the inner second side wall of the first member is joined to the outer second side wall of the second member by welding. The suspension arm having the main body with a closed section is thereby formed. Even in such a suspension arm having the third configuration, the thickness of the inner side wall is larger than the thickness of the outer side wall. As seen from the above, the suspension arm having the third configuration is practical from a production point of view.

In the case of the suspension arm having the third configuration, weld zones that join the first member and the second member are present on the first side wall and the second side wall. In short, no weld zone is present on the outer side wall. In general, when a weld zone is present in a region where a tensile strain can be produced, a fatigue crack is likely to occur from the weld zone serving as its origin. A region in the suspension arm where a tensile strain can be produced is a region of the outer side wall included in the curved portion. In this regard, in a conventional suspension arm, weld zones are present on its inner side wall and its outer side wall. This is because two formed members that are symmetrical to each other are joined together by welding. In the conventional suspension arm, a weld zone is present on its outer side wall. Therefore, the risk of a fatigue crack is high. In contrast, in the suspension arm having the third configuration, no weld zone is present on its outer side wall. Therefore, the risk of a fatigue crack is low.

The suspension arm having the third configuration preferably has the following configuration. The inner first side wall of the first member and the outer first side wall of the second member are joined together by butt joint welding. The inner second side wall of the first member and the outer second side wall of the second member are joined together by butt joint welding (fourth configuration).

In the suspension arm having the fourth configuration, the first member and the second member are joined by butt joint welding. In this case, joining portions between the first member and the second member include no lap portions between the first member and the second member. Accordingly, the suspension arm having the fourth configuration can combine keeping its rigidity and reducing its weight in addition to achieving a reduction in weight by eliminating the lap portions.

The suspension arm having the third configuration may include the following configuration. The inner first side wall of the first member and the outer first side wall of the second member are joined together by lap joint welding. The inner second side wall of the first member and the outer second side wall of the second member are joined together by lap joint welding (fifth configuration).

In the suspension arm having the fifth configuration, the first member and the second member are joined by lap joint welding. In this case, joining portions between the first member and the second member include lap portions between the first member and the second member. Accordingly, the suspension arm having the fifth configuration can combine keeping its rigidity and reducing its weight while the reduction in weight is not achieved as much as the suspension arm having the fourth configuration.

The suspension arm having any one of the third to fifth configurations may include the following configuration. The first member includes a first extension wall that corresponds to the first attachment portion and a first cylindrical portion that is formed in the first extension wall and corresponds to the first hole. The second member includes a second extension wall that faces the first extension wall and corresponds to the first attachment portion and a second cylindrical portion that is formed in the second extension wall and corresponds to the first hole (sixth configuration).

The suspension arm having the sixth configuration is suitable in the case where the main body is constituted by the first member and the second member. In the suspension arm having the sixth configuration, the first extension wall integrated with the first member and the second extension wall integrated with the second member form the first attachment portion of the suspension arm. For example, the first extension wall can be formed when the first member is formed by performing press forming on a steel sheet. For example, the second extension wall can be formed when the second member is formed by performing press forming on a steel sheet.

In addition, in the suspension arm having the sixth configuration, the first cylindrical portion integrated with the first member and the second cylindrical portion integrated with the second member form the first hole of the suspension arm. For example, the first cylindrical portion can be formed by performing piercing and burring on the first extension wall of the first member. The second cylindrical portion can be formed by performing piercing and burring on the second extension wall of the second member.

The first member and the second member are joined together to form the suspension arm. In the suspension arm, the first extension wall faces the second extension wall. Accordingly, the first extension wall and the second extension wall form the first attachment portion of the suspension arm. Further, the first cylindrical portion of the first member is disposed coaxially with the second cylindrical portion of the second member, and a front end of the first cylindrical portion of the first member is close to or in contact with a front end of the second cylindrical portion. Accordingly, an inner circumference of the first cylindrical portion and an inner circumference of the second cylindrical portion form the first hole of the suspension arm.

As seen from the above, the suspension arm having the sixth configuration is practical from a production point of view.

The suspension arm having any one of the third to sixth configurations may include the following configuration. The second member includes a third extension wall that corresponds to the second attachment portion, a first hole portion that is formed in the third extension wall and corresponds to the second hole, a fourth extension wall that faces the third extension wall and corresponds to the second attachment portion, and a second hole portion that is formed in the fourth extension wall and corresponds to the second hole (seventh configuration).

The suspension arm having the seventh configuration is suitable in the case where the main body is constituted by the first member and the second member. In the suspension arm having the seventh configuration, the third extension wall and the fourth extension wall that are integrated with the second member face each other and form the second attachment portion of the suspension arm. For example, the third extension wall and the fourth extension wall can be formed when the second member is formed by performing press forming on a steel sheet.

In addition, in the suspension arm having the seventh configuration, the first hole portion and the second hole portion of the second member form the second hole of the suspension arm. For example, the first hole portion and the second hole portion can be formed by performing piercing on the third extension wall and the fourth extension wall, respectively, in such a manner that the first hole portion is disposed coaxially with the second hole portion.

As seen from the above, the suspension arm having the seventh configuration is practical from a production point of view.

In a typical example, in the suspension arm having any one of the first to seventh configurations, a curvature radius of the inner side wall in the curved portion is 200 mm or less (eighth configuration).

In the suspension arm having the eighth configuration, the curvature radius of the inner side wall in the curved portion is small. In the case where a curvature radius of the curved portion is small, a compressive strain produced in the inner side wall is likely to increase, and the rigidity of the resultant suspension arm is likely to be regarded as a problem. On the other hand, in the case where the curvature radius of the curved portion is larger than 200 mm, an excessive compressive strain is unlikely to be produced in the inner side wall, and the rigidity of the resultant suspension arm is unlikely to be regarded as a problem. Therefore, the suspension arm having the eighth configuration can combine keeping its rigidity and reducing its weight even in the case where its rigidity is likely to be regarded as a problem.

In a typical example, the suspension arm having any one of the first to eighth configurations is an upper arm that is one of components constituting an independent suspension (ninth configuration).

However, the suspension arm having the ninth configuration is not limited to an upper arm of an independent suspension (e.g., a double wishbone suspension, a multi-link suspension, etc.). For example, the suspension arm may be a lower arm of an independent suspension or may be one of components constituting a suspension arm of another type.

A concrete example of suspension arms in the present embodiments will be described below with reference to the accompanying drawings. The same or equivalent parts in the drawings will be denoted by the same reference numerals, and description of the parts will not be repeated.

First Embodiment

With reference to FIG. 4 to FIG. 7, a suspension arm 1 in a first embodiment will be described. In the present embodiment, as an example of the suspension arm 1, an upper arm that is one of components constituting an independent suspension is adopted.

Figure 4:
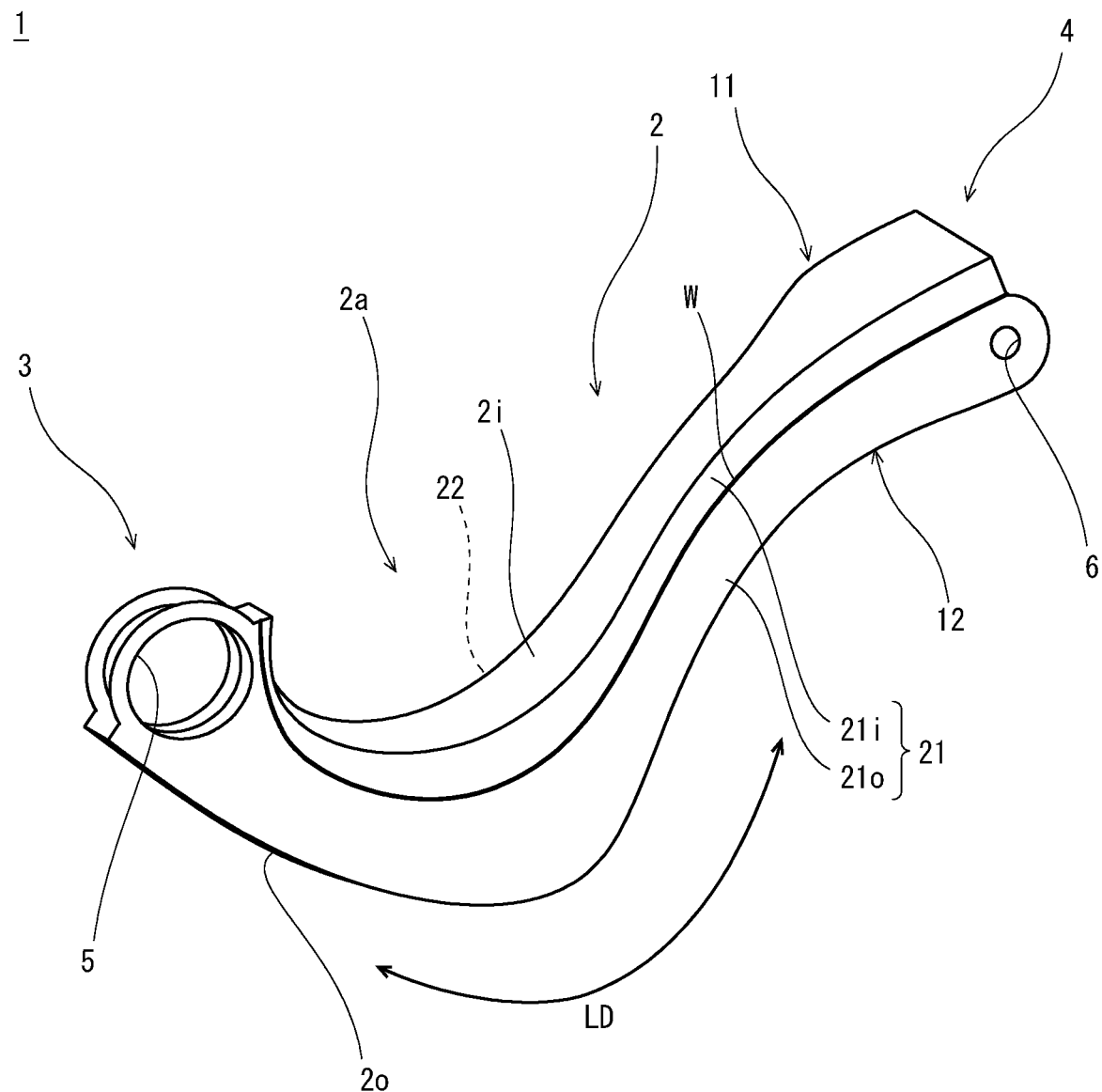
FIG. 4 is a perspective view of a suspension arm in a first embodiment.
Figure 5:
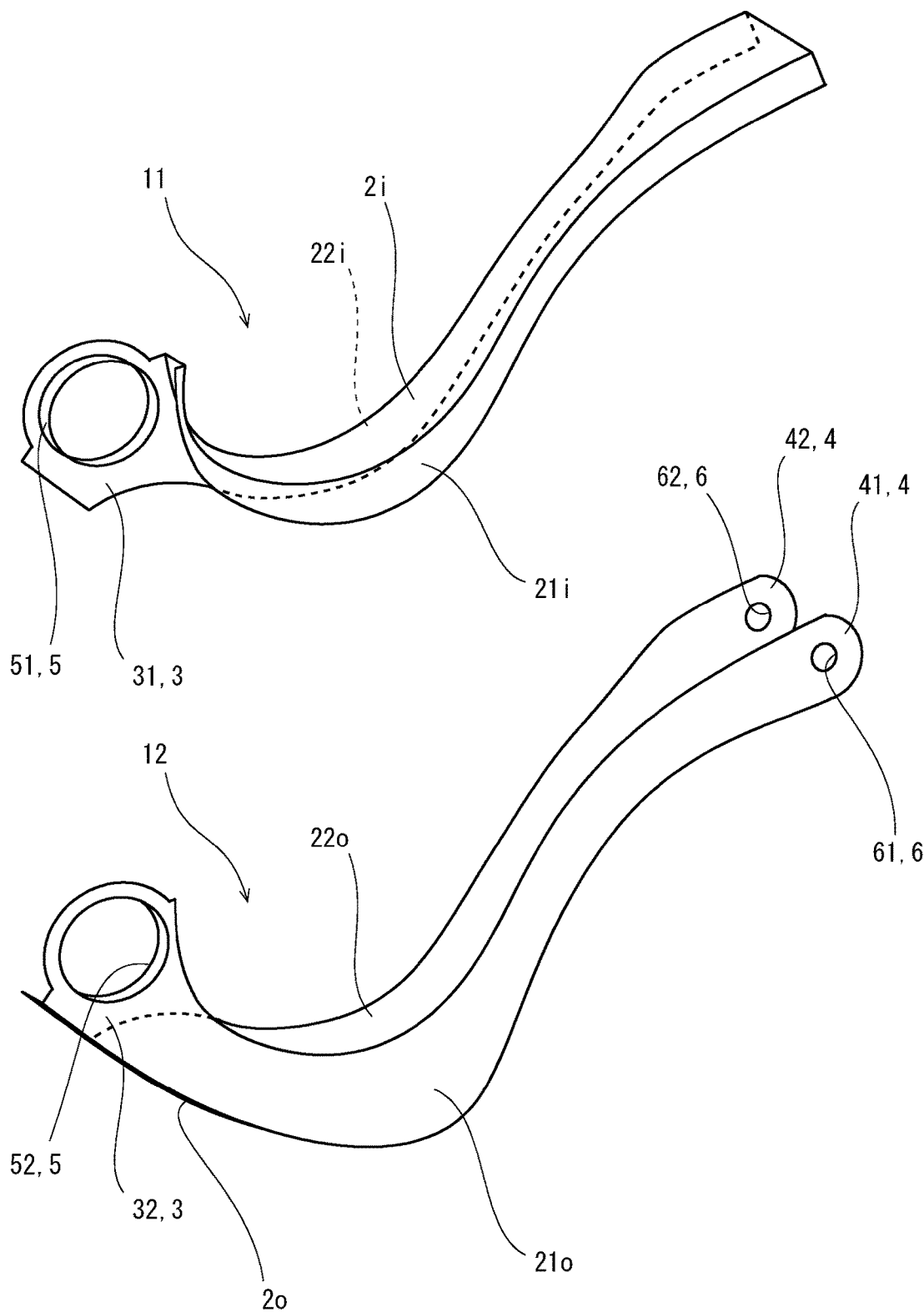
FIG. 5 is an exploded perspective view of the suspension arm illustrated in FIG. 4.
Figure 6:
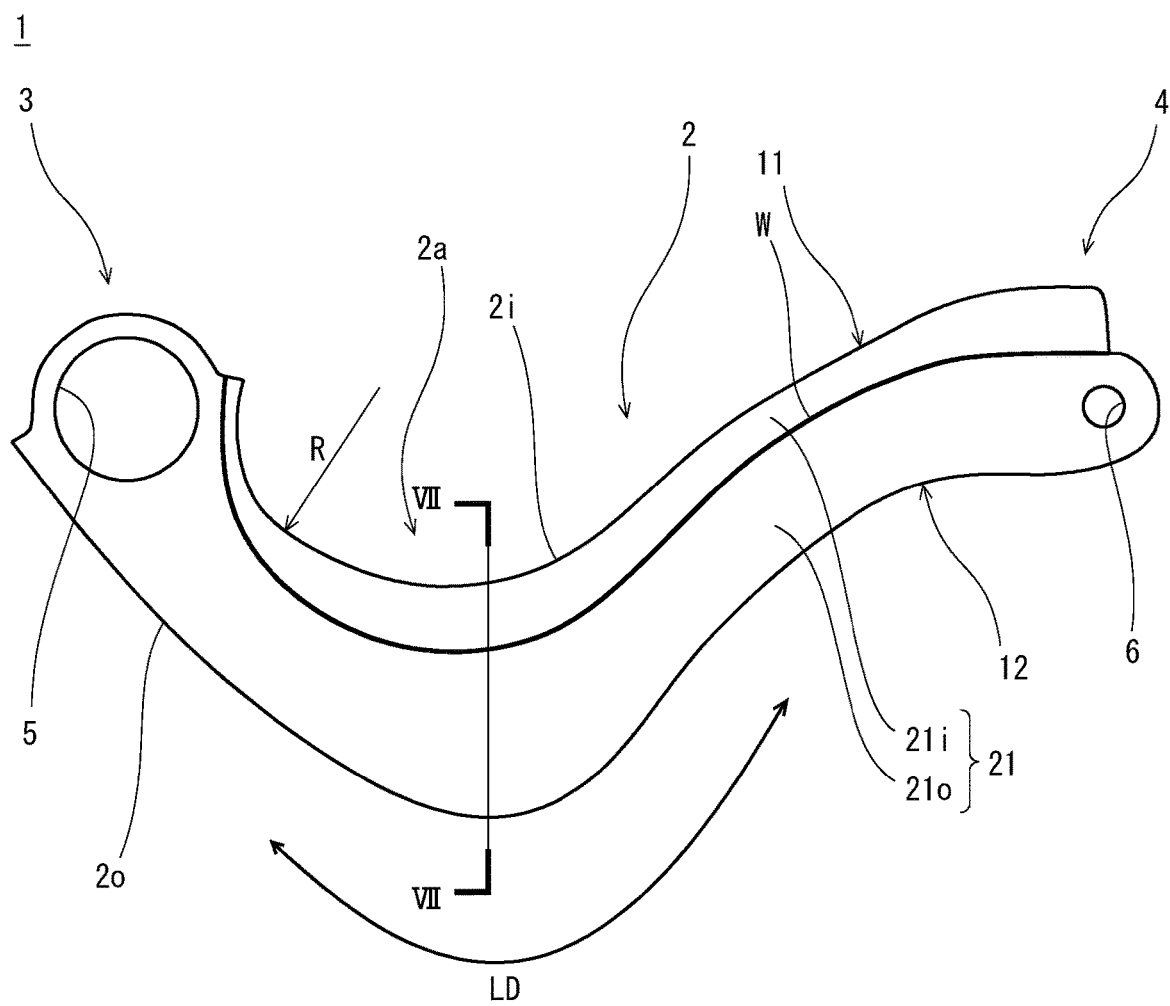
FIG. 6 is a side view of the suspension arm illustrated in FIG. 4.

FIG. 4 is a perspective view of the suspension arm 1 in the first embodiment. FIG. 5 is an exploded perspective view of the suspension arm 1 illustrated in FIG. 4. FIG. 6 is a side view of the suspension arm 1 illustrated in FIG. 4. FIG. 6 illustrates a plane of the suspension arm 1 illustrated in FIG.

Figure 7:
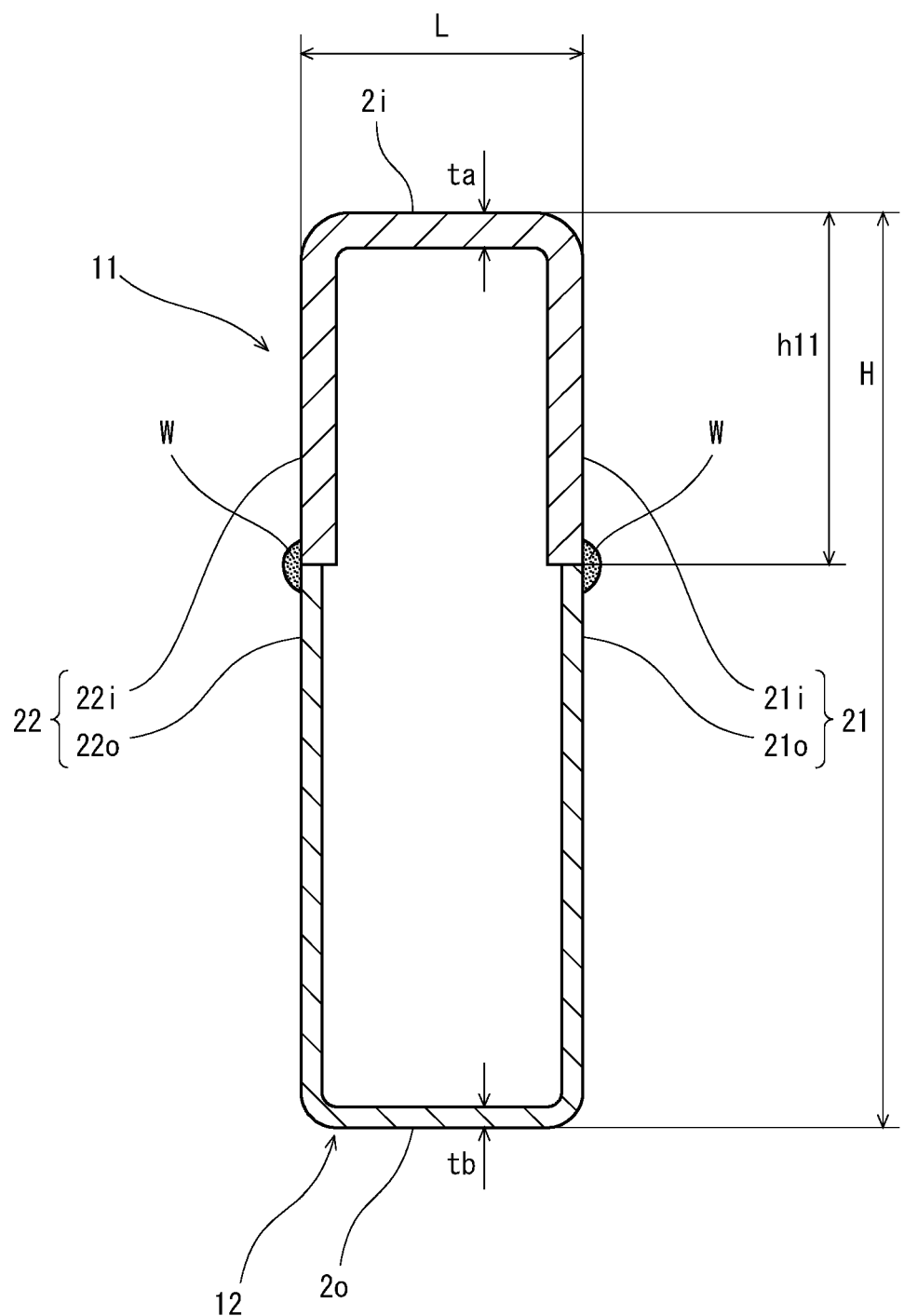
FIG. 7 is a sectional view taken along a line VII-VII in FIG. 6.

4 attached to a vehicle as viewed from the front or the rear. FIG. 6 illustrates the first side wall 21 and does not illustrate the second side wall. In FIG. 6, the second side wall is disposed behind the first side wall 21 and has the same shape as the first side wall 21. FIG. 7 is a sectional view taken along the line VII-VII in FIG. 6. The section illustrated in FIG. 7 is a section perpendicular to a longitudinal direction LD of the inner side wall 2*i* in the curved portion 2*a*. In short, the section illustrated in FIG. 7 is a transverse section of the suspension arm 1.

With reference to FIG. 4 to FIG. 7, the suspension arm 1 in the present embodiment includes a main body 2, a first attachment portion 3, and a second attachment portion 4, as with the suspension arm 1A illustrated in FIG. 1. The main body 2 includes a curved portion 2*a* that is curved along the longitudinal direction LD. A section of the main body 2 perpendicular to the longitudinal direction LD is a closed section. In short, the main body 2 has a closed section (see FIG. 7).

The first attachment portion 3 is provided at one end of the main body 2 in the longitudinal direction LD. The second attachment portion 4 is provided at the other end of the main body 2 in the longitudinal direction LD. The first attachment portion 3 has a first hole 5. The first hole 5 has a round shape. The first hole 5 is used to connect a wheel (not illustrated) and the suspension arm 1. The second attachment portion 4 has a second hole 6. The second hole 6 has a round shape. The second hole 6 is used to connect a vehicle body (not illustrated) and the suspension arm 1.

When the suspension arm 1 is attached to a vehicle, a shaft member (not illustrated) is inserted through the first hole 5, and another shaft member (not illustrated) is inserted through the second hole 6. The shaft members each have a round sectional shape. In the vehicle, the suspension arm 1 is supported by the shaft member inserted through the first hole 5 and the shaft member inserted through the second hole 6. In short, the suspension arm 1 is supported at both end portions (the first attachment portion 3 and the second attachment portion 4).

The main body 2 includes an inner side wall 2*i*, an outer side wall 2*o*, a first side wall 21, and a second side wall 22. The inner side wall 2*i* corresponds to an inner side of the curve of the curved portion 2*a*. The outer side wall 2*o* corresponds to an outer side of the curve of the curved portion 2*a*. In short, the inner side wall 2*i* is disposed inward from the curve of the curved portion 2*a*, and the outer side wall 2*o* is disposed outward from the curve of the curved portion 2*a*. The first side wall 21 connects one side edge of the inner side wall 2*i* and one side edge of the outer side wall 2*o*. The second side wall 22 connects the other side edge of the inner side wall 2*i* and the other side edge of the outer side wall 2*o*. The second side wall 22 faces the first side wall 21.

In the case where the suspension arm 1 is an upper arm, the curved portion 2*a* of the main body 2 is curved to be convex downward in the state where the suspension arm 1 is attached to a vehicle. Accordingly, the inner side wall 2*i* is located on an upper side, and the outer side wall 2*o* is located on a lower side. In addition, the longitudinal direction LD of the suspension arm 1 roughly matches a width direction of the vehicle. Accordingly, for example, the first side wall 21 faces the front of the vehicle, and the second side wall 22 faces the rear of the vehicle. When the vehicle turns, the suspension arm 1 receives a high compressive load in the longitudinal direction LD.

Referring to FIG. 6 and FIG. 7, in the suspension arm 1, a height H of the main body 2 is preferably larger than a width L of the main body 2. Here, the height H of the main body 2 is equivalent to a height of the first side wall 21 and is equivalent to a height of the second side wall 22. The height of the first side wall 21 is typically the same as the height of the second side wall 22. The height H of the main body 2 means lengths of the first side wall 21 and the second side wall 22 in sectional view perpendicular to the longitudinal direction LD. In addition, the width L of the main body 2 means a length of the inner side wall 2*i* or the outer side wall 2*o* in sectional view perpendicular to the longitudinal direction LD. In the example of the present embodiment, in sectional view perpendicular to the longitudinal direction LD, the length of the inner side wall 2*i* is the same as the length of the outer side wall 2*o*. A ratio H/L of the height H to the width L is, for example, 1.0 to 4.0, preferably 1.5 to 3.5, further preferably 2.0 to 3.0.

The suspension arm 1 in the present embodiment is constituted by a first member 11 and a second member 12. The first member 11 and the second member 12 are joined together by welding, thus forming the suspension arm 1.

Configurations of the first member 11 and the second member 12 will be described below specifically.

In the main body 2, the first side wall 21 is divided into an inner first side wall 21*i* and an outer first side wall 21*o*. The inner first side wall 21*i* is connected to the inner side wall 2*i*. The outer first side wall 21*o* is connected to the outer side wall 2*o*. In addition, in the main body 2, the second side wall 22 is divided into an inner second side wall 22*i* and an outer second side wall 22*o*. The inner second side wall 22*i* is connected to the inner side wall 2*i*. The outer second side wall 22*o* is connected to the outer side wall 2*o*. The first member 11 includes the inner side wall 2*i*, the inner first side wall 21*i*, and the inner second side wall 22*i*. The second member 12 includes the outer side wall 2*o*, the outer first side wall 21*o*, and the outer second side wall 22*o*.

The first member 11 and the second member 12 are members that are individually formed. A sheet thickness of the first member 11 is larger than a sheet thickness of the second member 12. Accordingly, a thickness to of the inner side wall 2*i* is larger than a thickness tb of the outer side wall 2*o* (see FIG. 7). In addition, thicknesses of the inner first side wall 21*i* and the inner second side wall 22*i* are larger than the thicknesses of the outer first side wall 21*o* and the outer second side wall 22*o*, respectively. This is because the thicknesses of the inner first side wall 21*i* and the inner second side wall 22*i* are the same as the thickness to of the inner side wall 2*i*, and the thicknesses of the outer first side wall 21*o* and the outer second side wall 22*o* are the same as the thickness tb of the outer side wall 2*o*.

Materials of the first member 11 and the second member 12 are not limited to specific materials. However, a material strength of the second member 12 is preferably higher than a material strength of the first member 11. The reason for this is that the sheet thickness of the first member 11 is larger than the sheet thickness of the second member 12. Since the first member 11 has a sheet thickness larger than the sheet thickness of the second member 12, a strength of the first member 11 as a member can be kept even when the first member 11 has a material strength lower than the material strength of the second member 12. At the same time, since the second member 12 has a sheet thickness smaller than the sheet thickness of the first member 11, the second member 12 preferably has a high material strength. A difference in material strengths between the first member 11 and the second member 12 is, for example, 0 to 250 MPa.

The inner first side wall 21*i* of the first member 11 is joined by welding to the outer first side wall 21*o* of the second member 12. The inner second side wall 22*i* of the first member 11 is joined by welding to the outer second side wall 22o of the second member 12. The first member 11 and the second member 12 are thereby joined together, forming the suspension arm 1 having the main body 2 with a closed section.

Referring to FIG. 4 and FIG. 5, in the present embodiment, the first member 11 further includes a first extension wall 31 and a first cylindrical portion 51. The first extension wall 31 corresponds to the first attachment portion 3. The first cylindrical portion 51 corresponds to the first hole 5.

In the first member 11, the first extension wall 31 is provided at one end of the main body 2 in the longitudinal direction LD. The first extension wall 31 smoothly extends from the inner second side wall 22i of the first member 11 while broadening. The first extension wall 31 is present substantially on the same plane as the inner second side wall 22i. The first extension wall 31 also smoothly extends from the inner side wall 2i and the inner first side wall 21i.

The first cylindrical portion 51 is formed in a portion that extends from the inner second side wall 22i in the first extension wall 31. The first cylindrical portion 51 projects toward a side on which the inner first side wall 21i is present. An inner circumference of the first cylindrical portion 51 penetrates the inner second side wall 22i. An inner diameter of the first cylindrical portion 51 is the same as a diameter of the first hole 5.

In the present embodiment, the second member 12 further includes a second extension wall 32 and a second cylindrical portion 52. The second extension wall 32 corresponds to the first attachment portion 3. The second cylindrical portion 52 corresponds to the first hole 5.

In the second member 12, the second extension wall 32 is provided at the one end of the main body 2 in the longitudinal direction LD. The second extension wall 32 smoothly extends from the outer first side wall 21o of the second member 12 while broadening. The second extension wall 32 is present substantially on the same plane as the outer first side wall 21o. The second extension wall 32 also smoothly extends from the outer side wall 2o.

The second cylindrical portion 52 is formed in a portion that extends from the outer first side wall 21o in the second extension wall 32. The second cylindrical portion 52 projects toward a side on which the outer second side wall 22o is present. An inner circumference of the second cylindrical portion 52 penetrates the outer first side wall 21o. An inner diameter of the second cylindrical portion 52 is the same as the diameter of the first hole 5.

As described above, when the first member 11 is joined by welding to the second member 12, the inner first side wall 21i is joined to the outer first side wall 21o, and the inner second side wall 22i is joined to the outer second side wall 22o. At this time, the portion extending from the inner second side wall 22i in the first extension wall 31 is joined by welding to a portion extending from the outer side wall 2o in the second extension wall 32 and is joined by welding to the outer second side wall 22o.

In the state where the first member 11 is joined to the second member 12, the portion extending from the inner second side wall 22i in the first extension wall 31 faces the portion extending from the outer first side wall 21o in the second extension wall 32. Accordingly, the first extension wall 31 and the second extension wall 32 form the first attachment portion 3 of the suspension arm 1.

Further, in the state where the first member 11 is joined to the second member 12, the first cylindrical portion 51 is disposed coaxially with the second cylindrical portion 52, and a front end of the first cylindrical portion 51 is close to or in contact with a front end of the second cylindrical portion 52. Accordingly, the inner circumference of the first cylindrical portion 51 and the inner circumference of the second cylindrical portion 52 form the first hole 5 of the suspension arm 1.

Note that, conversely to the above, the first extension wall 31 may smoothly extend from the inner first side wall 21i of the first member 11 while broadening. In this case, the first extension wall 31 also smoothly extends from the inner side wall 2i and the inner second side wall 22i. The first cylindrical portion 51 is formed in a portion that extends from the inner first side wall 21i in the first extension wall 31. The first cylindrical portion 51 projects toward a side on which the inner second side wall 22i is present. An inner circumference of the first cylindrical portion 51 penetrates the inner first side wall 21i.

In this case, conversely to the above, the second extension wall 32 smoothly extends from the outer second side wall 22o of the second member 12 while broadening. The second extension wall 32 also smoothly extends from the outer side wall 2o. A portion that extends from the outer second side wall 22o in the second extension wall 32 faces the portion extending from the inner first side wall 21i in the first extension wall 31. The second cylindrical portion 52 is formed in a portion that extends from the outer second side wall 22o in the second extension wall 32. The second cylindrical portion 52 projects toward a side on which the outer first side wall 21o is present. The inner circumference of the second cylindrical portion 52 penetrates the outer second side wall 22o.

In the present embodiment, the second member 12 further includes a third extension wall 41, a first hole portion 61, a fourth extension wall 42, and a second hole portion 62. The third extension wall 41 and the fourth extension wall 42 correspond to the second attachment portion 4. The first hole portion 61 and the second hole portion 62 correspond to the second hole 6.

In the second member 12, the third extension wall 41 and the fourth extension wall 42 are provided at the other end of the main body 2 in the longitudinal direction LD. The third extension wall 41 smoothly extends from the outer first side wall 21o of the second member 12. The third extension wall 41 is present substantially on the same plane as the outer first side wall 21o. The fourth extension wall 42 smoothly extends from the outer second side wall 22o of the second member 12. The fourth extension wall 42 is present substantially on the same plane as the outer second side wall 22o. The third extension wall 41 and the fourth extension wall 42 also smoothly extend from the outer side wall 2o. The third extension wall 41 and the fourth extension wall 42 extending from the outer side wall 2o are integrated together. A portion that extends from the outer first side wall 21o in the third extension wall 41 faces a portion that extends from the outer second side wall 22o in the fourth extension wall 42. Accordingly, the third extension wall 41 and the fourth extension wall 42 form the second attachment portion 4 of the suspension arm 1.

The first hole portion 61 is formed in the portion that extends from the outer first side wall 21o in the third extension wall 41. The first hole portion 61 penetrates the outer first side wall 21o. The second hole portion 62 is formed in the portion that extends from the outer second side wall 22o in the fourth extension wall 42. The second hole portion 62 penetrates the outer second side wall 22o. The first hole portion 61 and the second hole portion 62 are round holes and have diameters that are the same as a diameter of the second hole 6. The first hole portion 61 is formed such that it is disposed coaxially with the second hole portion 62. Accordingly, the first hole portion 61 and the second hole portion 62 form the second hole 6 of the suspension arm 1.

Note that, conversely to the above, the third extension wall 41, the first hole portion 61, the fourth extension wall 42, and the second hole portion 62 may be provided in the first member 11. In this case, in the first member 11, the third extension wall 41 and the fourth extension wall 42 are provided at the other end of the main body 2 in the longitudinal direction LD. The third extension wall 41 smoothly extends from the inner first side wall 21i of the first member 11. The fourth extension wall 42 smoothly extends from the inner second side wall 22i of the first member 11. The third extension wall 41 and the fourth extension wall 42 also smoothly extend from the outer side wall 2o. The third extension wall 41 and the fourth extension wall 42 extending from the outer side wall 2o are integrated together. A portion that extends from the inner first side wall 21i in the third extension wall 41 faces a portion that extends from the inner second side wall 22i in the fourth extension wall 42.

In this case, the first hole portion 61 is formed in the portion extending from the inner first side wall 21i in the third extension wall 41. The first hole portion 61 penetrates the inner first side wall 21i. The second hole portion 62 is formed in the portion extending from the inner second side wall 22i in the fourth extension wall 42. The second hole portion 62 penetrates the inner second side wall 22i. The first hole portion 61 is formed such that it is disposed coaxially with the second hole portion 62.

As seen from the above, the suspension arm 1 in the present embodiment is constituted by the first member 11 and the second member 12. In particular, the first member 11 includes the inner side wall 2i, and the second member 12 includes the outer side wall 2o that is different in shape from the inner side wall 2i. Accordingly, the first member 11 and the second member 12 have shapes that are asymmetrical to each other. In addition, the sheet thickness of the first member 11 is larger than the sheet thickness of the second member 12.

The first member 11 can be formed by performing pressing on a steel sheet. The second member 12 can be formed by performing pressing on a steel sheet that is thinner than the steel sheet for the first member 11. Note that the method of forming the first member 11 and the second member 12 is not limited to pressing.

The first extension wall 31 included in the first attachment portion 3 can be formed when the first member 11 is formed by performing press forming on a steel sheet. The second extension wall 32 included in the first attachment portion 3 can be formed when the second member 12 is formed by performing press forming on a steel sheet. The first cylindrical portion 51 included in the first hole 5 can be formed by performing piercing and burring on the first extension wall 31 of the first member 11. The second cylindrical portion 52 included in the first hole 5 can be formed by performing piercing and burring on the second extension wall 32 of the second member 12.

The third extension wall 41 and the fourth extension wall 42 to constitute the second attachment portion 4 can be formed when the second member 12 is formed by performing press forming on a steel sheet. The first hole portion 61 and the second hole portion 62 to constitute the second hole 6 can be formed by piercing on the third extension wall 41 and the fourth extension wall 42, respectively, before the first member 11 is joined to the second member 12. Note that the first hole portion 61 and the second hole portion 62 to constitute the second hole 6 may be formed after the first member 11 is joined to the second member 12.

Referring to FIG. 7, transverse sections of the first member 11 and the second member 12 each have a narrow U shape. In the present embodiment, the joining of the first member 11 and the second member 12 is performed by butt joint welding. Specifically, an open end (lower end) of the inner first side wall 21i of the first member 11 is butted against an open end (upper end) of the outer first side wall 210 of the second member 12, and the open ends are joined together by welding. An open end (lower end) of the inner second side wall 22i of the first member 11 is butted against an open end (upper end) of the outer second side wall 22o of the second member 12, and the open ends are joined together by welding. A method of the welding is not limited to a specific method. However, arc welding is preferably used. The method of the welding may be laser welding.

In this case, weld zones W that joins the first member 11 and the second member 12 are present on the first side wall 21 and the second side wall 22. In short, the weld zones W are not present on the outer side wall 2o. In the case where the joining is performed by butt joint welding, joining portions between the first member 11 and the second member 12 include no lap portions between the first member 11 and the second member 12.

In the present embodiment, the thickness ta of the inner side wall 2i and the thickness tb of the outer side wall 2o are set to satisfy Formula (1) and Formula (2) shown above, in which the surface area Sa of the inner side wall 2i and the surface area Sb of the outer side wall 2o are taken into consideration. For example, the thickness ta of the inner side wall 2i (the sheet thickness of the first member 11) is 2.9 mm, and the thickness tb of the outer side wall 2o (the thickness of the second member 12) is 2.3 mm.

Referring to FIG. 6, in the present embodiment, a curvature radius R of the inner side wall 2i in the curved portion 2a is 200 mm or less. In a case where the inner side wall 2i in the curved portion 2a is made by connecting a plurality of curves having different curvature radii, the minimum curvature radius of the curvature radii is 200 mm or less.

Advantageous Effects

In the suspension arm 1 in the present embodiment, the thickness ta of the inner side wall 2i is larger than the thickness tb of the outer side wall 2o. Such a situation arises by increasing the thickness ta of the inner side wall 2i and reducing the thickness tb of the outer side wall 2o by an amount larger than an amount by which the thickness ta of the inner side wall 2i is increased. In this case, the weight reduction of the suspension arm 1 can be achieved by reducing the thickness tb of the outer side wall 2o, and the rigidity of the suspension arm 1 can be kept by increasing the thickness ta of the inner side wall 2i. In addition, collision properties of the suspension arm are also enhanced.

In particular, the thickness ta of the inner side wall 2i and the thickness tb of the outer side wall 2o are set to satisfy Formula (1) and Formula (2) shown above. Under the condition given by Formula (1), in the suspension arm 1 in the present embodiment, the thickness ta of the inner side wall 2i is larger than the sheet thickness of the conventional suspension arm the sheet thickness of which is constant, and the thickness tb of the outer side wall 2o is smaller than the sheet thickness of the conventional suspension arm. In this case, as described above, the weight reduction of the suspension arm 1 can be achieved, and the rigidity of the suspension arm 1 can be kept. In addition, as long as the condition given by Formula (2) is satisfied, the second moment of area Iz of the suspension arm 1 in the present embodiment can be made smaller than the second moment of area Iy of the conventional suspension arm.

The suspension arm 1 in the present embodiment is constituted by the first member 11 including the inner side wall 2i and the second member 12 including the outer side wall 2o. The first member 11 and the second member 12 are individually formed. By joining the first member 11 and the second member 12 together by welding, the suspension arm 1 with the main body 2 with a closed section is formed. Therefore, the suspension arm 1 in the present embodiment is practical from a production point of view.

Further, by joining the first member 11 and the second member 12 together by welding, the suspension arm 1 including the first attachment portion 3 and the second attachment portion 4 is formed. Also in this regard, the suspension arm 1 in the present embodiment is practical from a production point of view.

In general, when a weld zone is present in a region where a tensile strain can be produced, a fatigue crack is likely to occur from the weld zone serving as its origin. A region in the suspension arm 1 where a tensile strain can be produced is a region of the outer side wall 2o included in the curved portion 2a. In this regard, in the case of the suspension arm 1 in the present embodiment, the weld zones W that join the first member 11 and the second member 12 are not present on the outer side wall 2o. Accordingly, the risk of a fatigue crack is low.

In the suspension arm 1 in the present embodiment, the joining portions between the first member 11 and the second member 12 include no lap portions between the first member 11 and the second member 12. Accordingly, it is possible to combine keeping its rigidity and reducing its weight in addition to achieving a reduction in weight by eliminating the lap portions.

[Suitable Conditions]

Suitable conditions for a height h11 of the first member 11 will be described below with reference to FIG. 7. The height h11 of the first member 11 is equivalent to a height of the inner first side wall 21i of the first side wall 21. The height of the inner first side wall 21i means a length of the inner first side wall 21i in sectional view perpendicular to the longitudinal direction LD. The height h11 of the first member 11 is also equivalent to a height of the inner second side wall 22i of the second side wall 22. The height of the inner second side wall 22i means a length of the inner second side wall 22i in sectional view perpendicular to the longitudinal direction LD.

If the height h11 of the first member 11 is excessively great, the inner first side wall 21i accounts for a large proportion of the height H of the first side wall 21. Similarly, if the height h11 of the first member 11 is excessively great, the inner second side wall 22i accounts for a large proportion of the height H of the second side wall 22. In this case, a proportion of the first member 11 to the second member 12 is large. As a result, there is the possibility that reduction in weight of the suspension arm 1 may be limited due to the sheet thickness of the first member 11 that is larger than the sheet thickness of the second member 12. For these reasons, the height h11 of the first member 11 is preferably not excessively great.

On the other hand, if the height h11 of the first member 11 is excessively small, the inner first side wall 21i accounts for a small proportion of the height H of the first side wall 21. Similarly, if the height h11 of the first member 11 is excessively small, the inner second side wall 22i accounts for a small proportion of the height H of the second side wall 22. In this case, a proportion of the first member 11 to the second member 12 is small. As a result, the reduction in weight of the suspension arm 1 becomes significant. On the other hand, there is the possibility that the rigidity of the suspension arm 1 may be decreased. Therefore, the height h11 of the first member 11 is preferably not excessively small.

Second Embodiment

Figure 8:
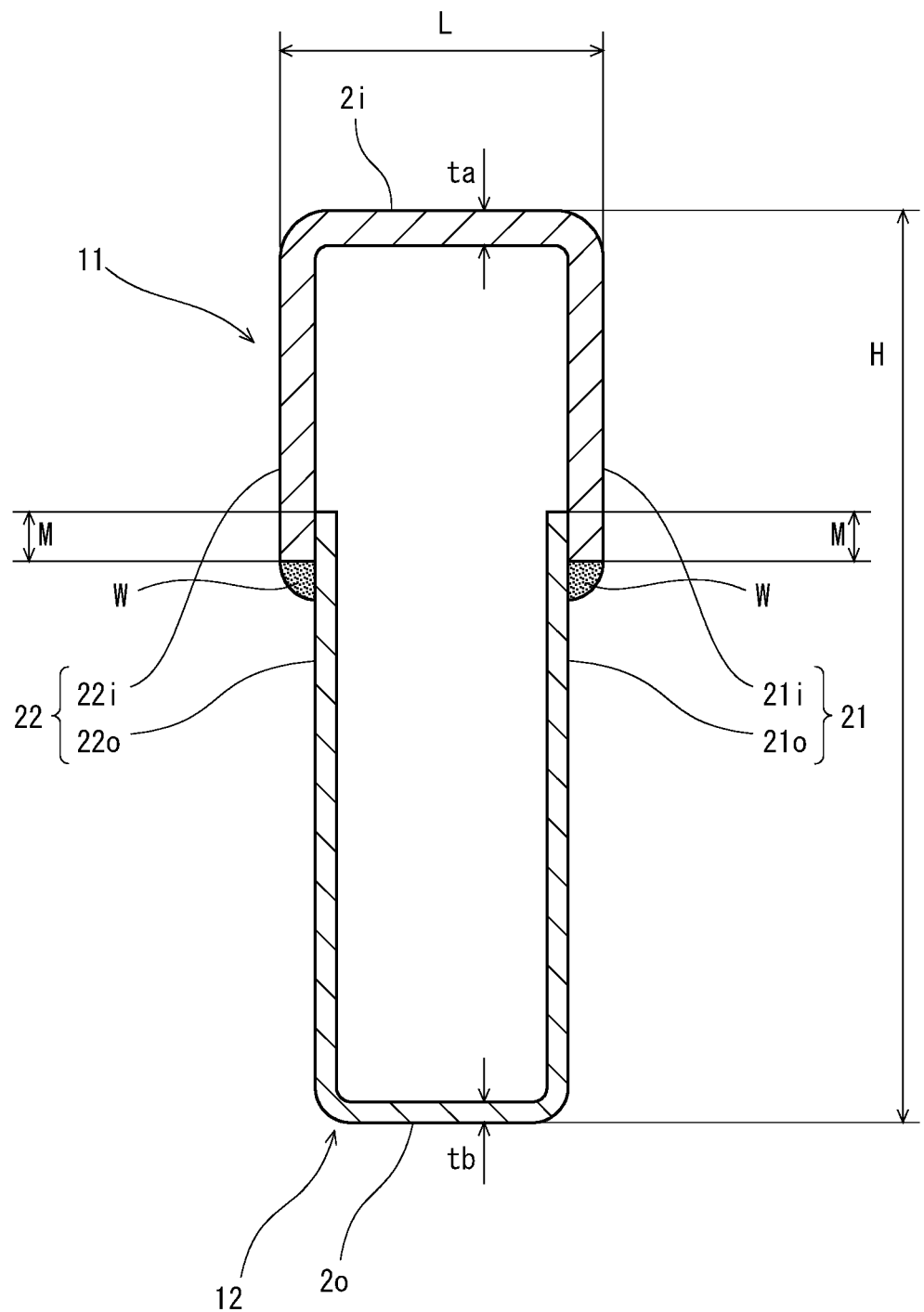
FIG. 8 is a sectional view of a suspension arm in a second embodiment.

With reference to FIG. 8, a suspension arm 1 in a second embodiment will be described. The suspension arm 1 in the present embodiment is a suspension arm that is obtained by modifying the suspension arm 1 in the first embodiment. Descriptions that duplicate descriptions in the first embodiment will be omitted as appropriate.

FIG. 8 is a sectional view of the suspension arm 1 in the second embodiment. FIG. 8 corresponds to the section illustrated in FIG. 7 described above.

Referring to FIG. 8, in the present embodiment, joining of a first member 11 and a second member 12 is performed by lap joint welding. Specifically, an open edge portion (lower edge portion) of an inner first side wall 21i of the first member 11 is made to overlap an open edge portion (upper edge portion) of an outer first side wall 21o of the second member 12, and the open edge portions are joined together by welding. An open edge portion (lower edge portion) of an inner second side wall 22i of the first member 11 is made to overlap an open edge portion (upper edge portion) of an outer second side wall 22o of the second member 12, and the open edge portions are joined together by welding. A method of the welding is not limited to a specific method. However, arc welding is preferably used. The method of the welding may be laser welding.

In the example illustrated in FIG. 8, the inner first side wall 21i of the first member 11 is made to overlap an outer surface of the outer first side wall 21o of the second member 12, and the inner second side wall 22i of the first member 11 is made to overlap an outer surface of the outer second side wall 22o of the second member 12. However, the inner first side wall 21i of the first member 11 may be made to overlap an inner surface of the outer first side wall 21o of the second member 12, and the inner second side wall 22i of the first member 11 may be made to overlap an inner surface of the outer second side wall 22o of the second member 12.

In the example of the present embodiment, in sectional view perpendicular to a longitudinal direction LD, a length of an inner side wall 2i is different from a length of an outer side wall 2o. In this case, in sectional view perpendicular to the longitudinal direction LD, the longer of the length of the inner side wall 2i and the length of the outer side wall 2o is referred to as a width L of a main body 2.

In the case of the suspension arm 1 in the present embodiment, as in the first embodiment, weld zones W that joins the first member 11 and the second member 12 are present on the first side wall 21 and the second side wall 22. Since the joining is performed by lap joint welding, joining portions between the first member 11 and the second member 12 include lap portions M between the first member 11 and the second member 12. The lap portions M are each about 5 mm. Accordingly, a weight of the suspension arm 1 is increased by a weight of the lap portions M compared with the first embodiment. Therefore, the suspension arm 1 in the present embodiment can combine keeping its rigidity and reducing its weight as with the suspension arm 1 in the first embodiment while the reduction in weight is not achieved as much as the suspension arm 1 in the first embodiment.

Example

To confirm effects of the suspension arms in the present embodiments, a CAE analysis was conducted by the same method as with the CAE analysis described above. As Inventive Example 1, an analytic model that assumed the suspension arm in the first embodiment was created. In Inventive Example 1, a first member and a second member were joined together by butt joint welding as illustrated in FIG. 7 described above. As Inventive Example 2, an analytic model that assumed the suspension arm in the second embodiment was created. In Inventive Example 2, a first member and a second member were joined together by lap joint welding as illustrated in FIG. 8 described above.

Figure 9:
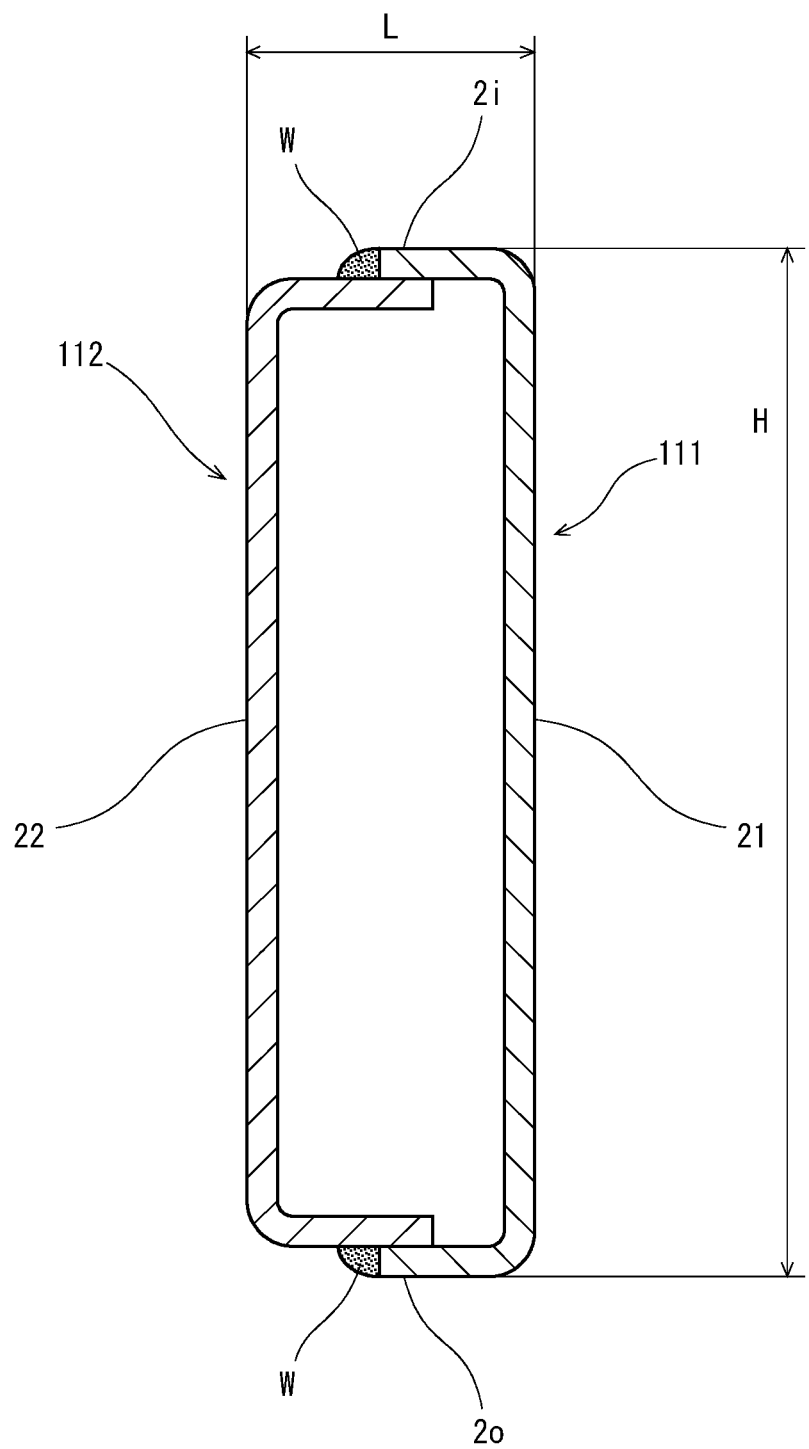
FIG. 9 is a sectional view of a conventional suspension arm.

For comparison, an analytic model that assumed the conventional suspension arm was created. FIG. 9 is a sectional view of a conventional suspension arm 101. FIG. 9 corresponds to the sections illustrated in FIG. 7 and FIG. 8 described above. Referring to FIG. 9, in Comparative Example, the suspension arm 101 was configured with two formed members 111 and 112 that were symmetrical to each other. The two formed members 111 and 112 had the same sheet thickness. The two formed members 111 and 112 were joined together by lap joint welding. Weld zones W between the two formed members 111 and 112 were present on an inner side wall 2*i* and an outer side wall 2*o*.

In Inventive Examples 1 and 2, sheet thicknesses of their first members were 2.9 mm, and sheet thicknesses of their second members were 2.3 mm. In short, thicknesses of their inner side walls were 2.9 mm, and thicknesses of their outer side walls were 2.3 mm. Accordingly, the thicknesses of the inner side walls were larger than the thicknesses of the outer side walls. In contrast, in the Comparative Example, the sheet thickness of the two formed members 111 and 112 was 2.6 mm. Accordingly, a thickness of its inner side wall was the same as a thickness of its outer side wall. In each of Inventive Examples 1 and 2, a ratio H/L of its height H to its width L was 2.5.

In each of the analytic models of Inventive Examples 1 and 2 as well as Comparative Example, a load was applied from its second hole toward its first hole. There were two levels of the load applied: 15 N and 40 N. A material of the suspension arm was set to a high-tensile steel of 780 MPa grade. Then, a displacement of the second hole in a loading direction was investigated. In addition, a weight of the suspension arm was calculated from each analytic model.

Figure 10:
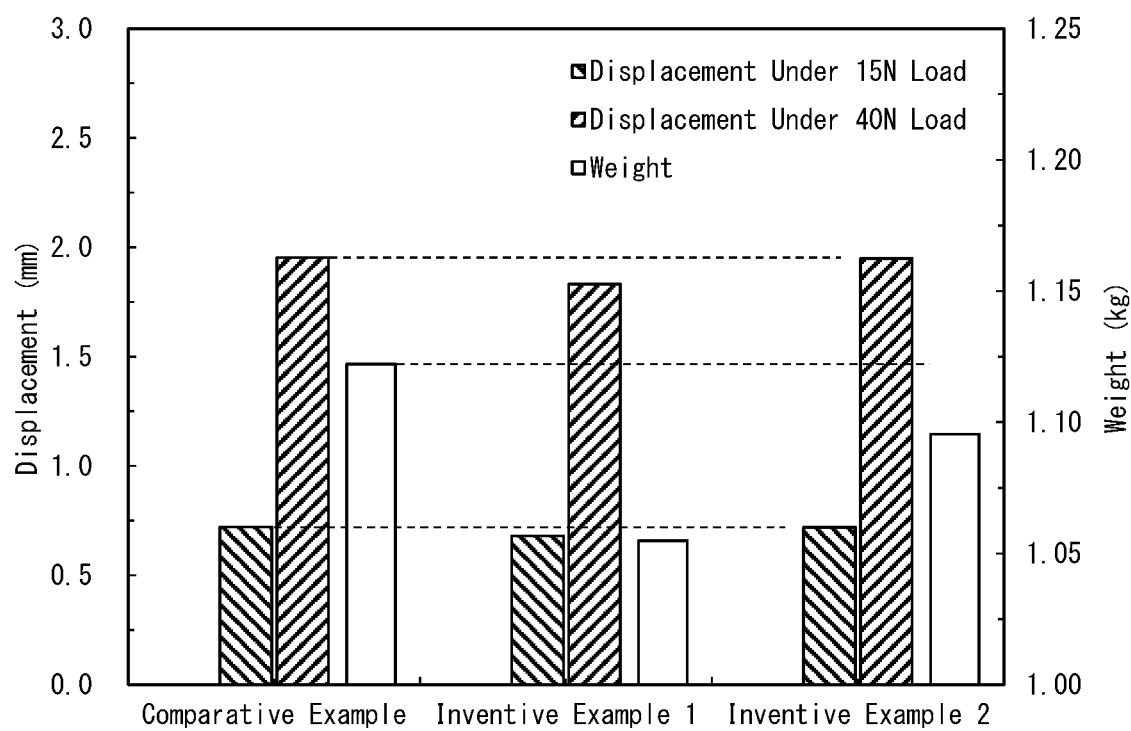
FIG. 10 is a graph that is a summary of results of an analysis in EXAMPLE.

FIG. 10 is a graph that is a summary of results of the analysis in EXAMPLE. Referring to FIG. 10, displacements of Inventive Example 1 were decreased from displacements in Comparative Example in the case where either of the loads of 15 N and 40 N was applied. In short, a rigidity of Inventive Example 1 was enhanced. Further, a weight of Inventive Example 1 was reduced to be less than a weight of Comparative Example. The displacements of Inventive Example 2 were the same as the displacements of Comparative Example. In short, a rigidity of Inventive Example 2 was the same as a rigidity of Comparative Example. Further, a weight of Inventive Example 2 was reduced to be less than the weight of Comparative Example.

Therefore, the suspension arms in the present embodiments demonstrated that it is possible to reduce a weight of a suspension arm while keeping a rigidity of the suspension arm.

Embodiments according to the present disclosure have been described above. However, the embodiments described above are merely examples of practicing the present disclosure. The present disclosure is therefore not limited to the embodiments described above, and the embodiments described above can be modified and practiced as appropriate without departing from the scope of the present invention.

REFERENCE SIGNS LIST

1: suspension arm
2: main body
2*a*: curved portion
2*i*: inner side wall
2*o*: outer side wall
21: first side wall
22: second side wall
11: first member
12: second member
21*i*: inner first side wall
21*o*: outer first side wall
22*i*: inner second side wall
22*o*: outer second side wall
3: first attachment portion
4: second attachment portion
5: first hole
6: second hole
ta: thickness of inner side wall
tb: thickness of outer side wall

The invention claimed is:

1. A suspension arm that comprises a main body including a curved portion and having a closed section, the curved portion being curved along a longitudinal direction, a first attachment portion provided at one end of the main body in the longitudinal direction and including a first hole, and a second attachment portion provided at another end of the main body in the longitudinal direction and including a second hole, wherein
the main body includes:
  an inner side wall that corresponds to an inner side of a curve of the curved portion;
  an outer side wall that corresponds to an outer side of the curve of the curved portion;
  a first side wall that connects one side edge of the inner side wall and one side edge of the outer side wall; and
  a second side wall that connects another side edge of the inner side wall and another side edge of the outer side wall and faces the first side wall,
a thickness of the inner side wall is larger than a thickness of the outer side wall,
in sectional view of the main body perpendicular to the longitudinal direction, each of a length of the first side wall and a length of the second side wall is longer than each of a length of the inner side wall and a length of the outer side wall, and
a ratio of a height of the main body to a width of the main body is 2.0 to 4.0.

2. The suspension arm according to claim 1, wherein
the thickness ta of the inner side wall, the thickness tb of the outer side wall, a surface area Sa of the inner side wall, and a surface area Sb of the outer side wall satisfy Formula (1) shown below, and
in a section of the inner side wall in the curved portion, the section being perpendicular to the longitudinal direction, a second moment of area Iz in a case where ta denotes the thickness of the inner side wall, and tb denotes the thickness of the outer side wall satisfies Formula (2) shown below in comparison with a second moment of area Iy in a case where the thickness of the inner side wall and the thickness of the outer side wall are assumed to be "(Sa×ta+Sb×tb)/(Sa+Sb)":

$$ta > (Sa \times ta + Sb \times tb)/(Sa+Sb) > tb \tag{1}$$

$$Iz > Iy \times 0.85 \tag{2}$$

3. The suspension arm according to claim 1, wherein
the first side wall is divided into an inner first side wall and an outer first side wall, the inner first side wall being connected to the inner side wall, the outer first side wall being connected to the outer side wall,
the second side wall is divided into an inner second side wall and an outer second side wall, the inner second side wall being connected to the inner side wall, the outer second side wall being connected to the outer side wall,
the main body includes:
  a first member that includes the inner side wall, the inner first side wall, and the inner second side wall; and
  a second member that includes the outer side wall, the outer first side wall, and the outer second side wall,
a sheet thickness of the first member is larger than a sheet thickness of the second member, and
the first member and the second member are joined together by welding.

4. The suspension arm according to claim 3, wherein
the inner first side wall of the first member and the outer first side wall of the second member are joined together by butt joint welding, and
the inner second side wall of the first member and the outer second side wall of the second member are joined together by butt joint welding.

5. The suspension arm according to claim 3, wherein
the inner first side wall of the first member and the outer first side wall of the second member are joined together by lap joint welding, and
the inner second side wall of the first member and the outer second side wall of the second member are joined together by lap joint welding.

6. The suspension arm according to claim 3, wherein
the first member includes a first extension wall and a first cylindrical portion, the first extension wall corresponding to the first attachment portion, the first cylindrical portion being formed in the first extension wall and corresponding to the first hole, and
the second member includes a second extension wall and a second cylindrical portion, the second extension wall facing the first extension wall and corresponding to the first attachment portion, the second cylindrical portion being formed in the second extension wall and corresponding to the first hole.

7. The suspension arm according to claim 3, wherein
the second member includes a third extension wall, a first hole portion, a fourth extension wall, and a second hole portion, the third extension wall corresponding to the second attachment portion, the first hole portion being formed in the third extension wall and corresponding to the second hole, the fourth extension wall facing the third extension wall and corresponding to the second attachment portion, the second hole portion being formed in the fourth extension wall and corresponding to the second hole.

8. The suspension arm according to claim 1, wherein
a curvature radius of the inner side wall in the curved portion is 200 mm or less.

9. The suspension arm according to claim 1, wherein
the suspension arm is an upper arm that is one of components constituting an independent suspension.

* * * * *